United States Patent
Nevill et al.

(10) Patent No.: US 6,904,517 B2
(45) Date of Patent: Jun. 7, 2005

(54) DATA PROCESSING APPARATUS AND METHOD FOR SAVING RETURN STATE

(75) Inventors: Edward Colles Nevill, Huntingdon (GB); Ian Victor Devereux, Cambridge (GB)

(73) Assignee: Arm Limited, Cambridge (GB)

( * ) Notice: Subject to any disclaimer, the term of this patent is extended or adjusted under 35 U.S.C. 154(b) by 549 days.

(21) Appl. No.: 09/985,268

(22) Filed: Nov. 2, 2001

(65) Prior Publication Data

US 2002/0099933 A1 Jul. 25, 2002

(30) Foreign Application Priority Data

Nov. 27, 2000 (GB) .............................................. 0028869

(51) Int. Cl.⁷ ................................................. G06F 9/00
(52) U.S. Cl. ...................................... 712/228; 712/244
(58) Field of Search ................................ 712/228, 227, 712/244, 202; 711/132

(56) References Cited

U.S. PATENT DOCUMENTS

| | | | |
|---|---|---|---|
| 3,889,243 A | | 6/1975 | Drimak |
| 4,236,204 A | | 11/1980 | Groves |
| 4,587,632 A | | 5/1986 | Ditzel |
| 4,922,414 A | | 5/1990 | Holloway et al. |
| 4,926,322 A | * | 5/1990 | Stimac et al. .................. 703/23 |
| 4,969,091 A | | 11/1990 | Muller |
| 5,136,696 A | | 8/1992 | Beckwith et al. |
| 5,303,378 A | * | 4/1994 | Cohen ......................... 710/264 |
| 5,455,775 A | | 10/1995 | Huber et al. |
| 5,619,665 A | | 4/1997 | Emma |
| 5,638,525 A | | 6/1997 | Hammond et al. |
| 5,659,703 A | | 8/1997 | Moore et al. |
| 5,740,461 A | | 4/1998 | Jaggar |
| 5,742,802 A | | 4/1998 | Harter et al. |
| 5,752,035 A | | 5/1998 | Trimberger |
| 5,784,584 A | | 7/1998 | Moore et al. |
| 5,809,336 A | | 9/1998 | Moore et al. |
| 5,838,948 A | | 11/1998 | Bunza |
| 5,875,336 A | | 2/1999 | Dickol et al. |
| 5,892,966 A | | 4/1999 | Petrick et al. |
| 5,925,123 A | | 7/1999 | Tremblay et al. |
| 5,926,832 A | | 7/1999 | Wing et al. |
| 5,937,193 A | | 8/1999 | Evoy |
| 5,953,741 A | | 9/1999 | Evoy et al. |
| 6,003,038 A | * | 12/1999 | Chen ....................... 707/103 R |

(Continued)

FOREIGN PATENT DOCUMENTS

FR    2 779 842    12/1999

OTHER PUBLICATIONS

Bob Smith, "Re: Using the int instruction in prot mode at ring e" bsmith@intrepid.net, Jul. 1997, p. 1, line 37—p. 2, line 4.

(Continued)

*Primary Examiner*—Henry W. H. Tsai
(74) *Attorney, Agent, or Firm*—Nixon & Vanderhye P.C.

(57) ABSTRACT

The present invention provides a data processing apparatus and method for saving return state. The data processing apparatus comprises a processing unit for executing data processing instructions, the processing unit having a plurality of modes of operation, with each mode of operation having a corresponding stack for storing data associated with that mode. The processing unit is responsive to a return state data processing instruction to write return state data of the processing unit from its current mode of operation to a stack corresponding to a different mode of operation to the current mode of operation. This approach significantly reduces code size and improves interrupt latency over known prior art techniques.

18 Claims, 12 Drawing Sheets

U.S. PATENT DOCUMENTS

| | | |
|---|---|---|
| 6,003,126 A | 12/1999 | Huynh et al. |
| 6,009,499 A | 12/1999 | Koppala |
| 6,009,509 A | 12/1999 | Leung et al. |
| 6,014,723 A | 1/2000 | Tremblay et al. |
| 6,021,469 A | 2/2000 | Tremblay et al. |
| 6,026,485 A | 2/2000 | O'Connor |
| 6,031,992 A | 2/2000 | Cmelik et al. |
| 6,038,643 A | 3/2000 | Tremblay et al. |
| 6,070,173 A | 5/2000 | Huber et al. |
| 6,088,786 A | 7/2000 | Feierbach et al. |
| 6,122,638 A | 9/2000 | Huber et al. |
| 6,125,439 A | 9/2000 | Tremblay et al. |
| 6,148,391 A | 11/2000 | Petrick |
| 6,298,434 B1 | 10/2001 | Lindwer |
| 6,317,872 B1 | 11/2001 | Gee et al. |
| 6,338,134 B1 | 1/2002 | Leung et al. |
| 6,349,377 B1 | 2/2002 | Lindwer |
| 6,374,286 B1 | 4/2002 | Gee et al. |
| 6,606,743 B1 | 8/2003 | Raz et al. |

OTHER PUBLICATIONS

D. Mothersole et al, "Interrupt Stack Mechanism" *MOTOROLA Technical Developments*, vol. 6, No. 1, Oct. 1986, p. 49.

D. Bursky, "Register Windows Speed Real–Time Control Tasks" *Electronic Design International*, vol. 38, No. 21, No. 1990, pp. 57, 58, 60, 61.

H. Stone, Chapter 12 —"A Pipeline Push–Down Stack Computer", 1969, pp. 235–249.

C. Glossner et al, "Delft–Java Link Translation Buffer", Aug. 1998.

N. Vijaykrishnan et al, "Object–Oriented Architectural Support For a Java Processor" 1998, pp. 330–355.

C. Glossner et al, "The Delft–Java Engine: An Introduction", Aug. 1997.

K. Ebcioglu et al, "A Java ILP Machine Based On Fast Dynamic Compilation", Jan. 1997, pp. 1–13.

A. Wolfe, "First Java–specific chip takes wing" *EETimes*—1997.

Y. Patt, *Introduction to Computer Systems From Bits and Gates to C and Beyond,* 1999, pp. 1–517.

M. Ertl, "Stack Caching for Interpreters" 1994, pp. 1–13.

M. Ertl, "Stack Caching for Interpreters" 1995, pp. 1–13.

M. Ertl, "Implementation of Stack–Based Languages on Register Machines" Apr. 1996, pp. 1 4.

J. O'Connor et al, "PicoJava–I: The Java Virtual Machine in Hardware" *IEEE Micro* A Case for Intelligent RAM, Mar./Apr. 1997, pp. 45–53.

K. Andrews et al, "Migrating a CISC Computer Family Onto RISC Via Object Code Translation" 1992, pp. 213–222.

"PicoJava I Microprocessor Core Architecture" Oct. 1996, pp. 1–8, Sun Microsystems.

M. Ertl, "A New Approach to Forth Native Code Generation" 1992.

M. Maierhofer et al, "Optimizing Stack Code" 1997, p. 19.

D. Ungar et al, "Architecture of SOAR: Smalltalk on a RISC" The 11th Annual International Symposium on Computer Architecture, Jun. 1984, pp. 188–197.

O. Steinbusch, "Designing Hardware to Interpret Virtual Machine Instructions" Feb. 1998, pp. 1–59.

R. Kapoor et al, "Stack Renaming of the Java Virtual Machine" Dec. 1996, pp. 1–17.

A. Yonezawa et al, "Implementing Concurrent Object–Oriented Languages in Multicomputers" *Parallel and Distributed Technology* (*Systems and Applications*) May 1993, pp. 49–61.

C. Hsieh et al, "Java Bytecode to Native Code Translation; The Caffeine Prototype and Preliminary Results" IEEE/ACM International Symposium on Microarchitecture, Dec. 1996, pp. 90–97.

Y. Patt et al, *Introduction to Computer Systems From Bits and Gates to C and Beyond,* 2001; pp. 1–526.

Sun Microsystems PicoJava Processor Core Data Sheet, Dec. 1997, pp. 1–11.

H. McGhan et al, PicoJava A Direct Execution Engine for Java Bytecode, Oct. 1998, pp. 22–26.

C. Glossner et al, "Parallel Processing" Euro–Par 1997: Passau, Germany, Aug. 1997.

Y. Patt, *Introduction to Computer Systems From Bits and Gates to C and Beyond,* 1999, pp. 10–12 & 79–82.

Espresso—The High Performance Java Core Specification, Oct. 2001, pp. 1–33, Aurora VLSI, Inc.

J. Gosling, "Java Intermediate Bytecodes" 1995, pp. 111–118.

P. Koopman, Jr. "Stack Computers The New Wave" 1989, pp. 1–234.

M. Mrva et al, "A Scalable Architecture for Multi–Threaded JAVA Applications" Design Automation and Test in Europe, Feb. 1998, pp. 868–874.

L. Chang et al, "Stack Operations Folding in Java Processors" *IEEE Proc.—Comput. Digit. Tech.,* vol. 145, No. 5, pp. 333–340 Sep. 1998.

L. Ton et al, Proceedings of the '97 International Conference on Parallel and Distributed Systems, "Instruction Folding in Java Processor", pp. 138–143, Dec. 1997.

K. Buchenrieder et al, "Scalable Processor Architecture for Java With Explicit Thread Support" *Electronics Letters* vol. 33, No. 18, pp. 1532+, Aug. 1997.

C. Chung et al, Proceedings of the '98 International Conference on Parallel and Distributed Systems, "A Dual Threaded Java Processor for Java Multithreading" pp. 693–700, Dec. 1998.

I. Kazi et al, "Techniques for Obtaining High Performance in Java Programs" Sep. 2000, pp. 213–240.

R. Kieburtz, "A RISC Architecture for Symbolic Computation" 1987, pp. 146–155.

M. Berekovic et al, "Hardware Realization of a Java Virtual Machine for High Performance Multimedia Applications" *Signal Processing Systems SIPS 98,* pp. 479–488, 1997.

P. Deutsch, "Efficient Implementation of the Smalltalk–80 System" 1983, pp. 297–302.

"Rockwell Produces Java Chip" Sep. 1997, CNET News. com.

Y. Patt et al, *Introduction to Computing Systems from Bits and Gates to C and Beyond,* 2001, pp. 1–16, 91–118 & 195–209.

\* cited by examiner

DATA PROCESSING APPARATUS AND METHOD FOR SAVING RETURN STATE

BACKGROUND OF THE INVENTION

1. Field of the Invention

The present invention relates to a data processing apparatus and method for saving return state, and more specifically to the saving of the return state in a data processing apparatus incorporating a processing unit having a plurality of modes of operation, with each mode of operation having a corresponding stack storing data associated with that mode.

2. Description of the Prior Art

Within such a data processing apparatus, it is known to provide instructions which are arranged to save return state data on the stack associated with a current mode of operation. A typical example of where such instructions are used is upon occurrence of an exception, in which event the return state data is saved on the stack associated with the exception mode of operation. This procedure may be required for a variety of reasons. For example, such a data processing apparatus may typically support multi-tasking, and when a context switch is to be performed in order to enable another task to execute, the stack or stacks associated with the modes of operation of the current task need to be swapped in order to enable that new task to execute. In systems where the stacks are accessed using stack pointers, this swapping is usually performed by swapping the stack pointer or stack pointers of the various stacks. In such a data processing apparatus, it is typically required that the return state data is saved on a stack which will be swapped when the context switch occurs.

In order to facilitate context switching, it is required that all stacks that are non-empty at the time of the context switch are swapped. On a processor with multiple stacks, this can require swapping every stack belonging to a particular task. Additionally, if this approach is used, a separate stack per mode of operation has to be maintained for each task, and this leads to increased memory consumption and increased time taken to swap each stack belonging to each task. For example, the current processor produced by ARM Limited has six separate stacks corresponding to six modes of operation, namely System/User, FIQ (Fast Interrupt Request), Supervisor, Abort, IRQ (Interrupt ReQuest) and Undefined, where FIQ and IRQ are two interrupt modes of operation. Therefore, using the above approach, a context switch may require the swapping of six separate stacks, and each task may have to reserve memory for six separate stacks. An example of such an approach will be discussed later with reference to FIGS. 2A and 2B. FIGS. 2A and 2B show a system with five rather than six stacks, since they illustrate an example of a typical system where it is assumed that the FIQ mode is reserved for a single high priority interrupt which will not cause a context switch.

An alternative, more commonly used, approach is to share the various exception stacks amongst the tasks, and to then transfer any data on an exception stack to either the user stack or a single per process privileged mode stack on entry to an exception. Taking the earlier example of the processor currently produced by ARM Limited, this would equate to transferring data from the FIQ, Abort, IRQ or Undefined stacks to the User or Supervisor stacks. This approach ensures that all exception stacks (FIQ, Abort, IRQ and Undefined in the example of the ARM processor) remain empty at all points where a context switch may be required.

The data saved on entry to an exception is usually that data which is required for the task to continue execution from the point at which the exception occurred. This data is termed the "return state data".

The above-described second approach requires that on entry to an exception, the return state is saved on the stack associated with the exception mode of operation, the processor user or privileged mode is entered, and the return state data is then read back from the stack associated with the exception mode of operation and saved on the stack associated with the user or privileged mode. The return state cannot simply be saved from the user or privileged mode after the user or privileged mode has been entered, because the return state is not accessible from that mode. This process will be discussed in more detail later with reference to the example of FIGS. 3A and 3B.

This process of saving the return state data on the stack belonging to the exception mode of operation, changing mode, recovering the return state data from the stack belonging to the exception mode of operation, and saving the return state data on the user or privileged mode stack, requires a significant number of instructions which adversely affects code size and performance of the data processing apparatus.

Additionally, it should be noted that this processing is required at a critical point in interrupt handling when interrupts are disabled, therefore leading to significant interrupt latency. It should be noted that interrupts cannot be re-enabled until the return state data is saved on the user or privileged mode stack in case a further interrupt arrives and overwrites the return state data before it an be saved.

Accordingly, it is desirable to provide a more efficient technique for saving the return state data upon occurrence of an exception.

SUMMARY OF THE INVENTION

Viewed from a first aspect, the present invention provides a data processing apparatus, comprising: a processing unit for executing data processing instructions, the processing unit having a plurality of modes of operation, each mode of operation having a corresponding stack for storing data associated with that mode; the processing unit being responsive to a return state data processing instruction to write return state data of the processing unit from its current mode of operation to a stack corresponding to a different mode of operation to the current mode of operation.

In accordance with the present invention, a return state data processing instruction is provided which is used to cause the processing unit to write the return state data of the processing unit from its current mode of operation to a stack corresponding to a different mode of operation to the current mode of operation.

It has been found that the present invention enables code size to be reduced and performance to be improved. The invention may be used in a variety of implementations, but is of particular benefit in real time operating systems, particularly those requiring fast context switching, for example multi-tasking operating systems such as Linux.

In preferred embodiments, the return state data processing instruction is invoked upon occurrence of an exception.

It will be appreciated that the exception may be any suitable exception, and for example can be any of the standard exceptions occurring within a data processing apparatus, including interrupts of all types, aborts of all types, undefined instruction exceptions, address exceptions, software interrupts and any other exceptions that may be generated. More particularly, in preferred embodiments, the exception is one or more of Data Abort, Prefetch Abort, Address Exception, Undefined Instruction, Reset, Software Interrupt, Interrupt Request or Fast Interrupt Request.

Hence, in preferred embodiments, the exception causing the data processing instruction to be invoked may be any of a predetermined set of exceptions, and that predetermined set of instructions may include one or more interrupts.

It has been found that the preferred embodiment of the present invention enables code size to be reduced, by reducing the number of instructions required at the start of an exception handler. Furthermore, the preferred embodiment enables the performance to be improved, by reducing the number of cycles required at the start of the exception handler. As these cycles typically occur at a critical point where interrupts are disabled, this has the advantage of significantly reducing interrupt latency. The preferred embodiment of the invention may be used in a variety of implementations, but is of particular benefit in real time operating systems, particularly those requiring very low interrupt latency, for example operating systems controlling disk drives.

In preferred embodiments, the data processing apparatus further comprises: a set of registers, including a plurality of return state registers for storing the return state data of the processing unit for each mode of operation, the processing unit being able only to access return state registers containing the return state data of the processing unit from its current mode of operation. This requires the return state to be saved to an appropriate stack prior to changing the mode of operation, since once the mode of operation has been changed, those return state registers will not be accessible except by re-entering the original exception mode.

It will be appreciated that the stacks may be implemented in a variety of ways. However, in preferred embodiments, each stack has a stack pointer associated therewith identifying a location within the stack, the stack pointer for a particular stack only being accessible from the corresponding mode of operation. Accordingly, in any particular mode of operation, the processing unit will typically only be able to access its corresponding stack, since it will typically only have access to that stack's stack pointer.

In preferred embodiments where a set of registers is provided within the data processing apparatus, the set of registers preferably further include a plurality of stack pointer registers for storing the stack pointers for each stack, the processing unit being able only to access the stack point register containing the stack pointer for the stack corresponding to its current mode of operation. Hence, the processing unit in its current mode of operation can only access the stack point register in order to obtain the stack pointer for its corresponding stack.

It will be appreciated that the return state data processing instruction provided in accordance with the present invention may take a variety of forms. However, in preferred embodiments the return state data processing instruction includes a stack identifier field for identifying the stack to which the return state data of the processing unit is to be written.

In preferred embodiments, where each stack has a stack pointer associated therewith, it is apparent that the processing unit needs to have knowledge of the stack pointer in order to write the return state data to the appropriate location (s) within the destination stack. Accordingly, in preferred embodiments, the stack identifier field is arranged to specify a stack pointer for the stack to which the return state data of the processing unit is to be written, thereby enabling the processing unit to access an appropriate location in that stack when writing the return state data to that stack.

Further, in preferred embodiments, the return state data processing instruction includes an optional update field, which is set to indicate that the stack pointer is to be updated once the return state data has been written to the stack. Typically the stack pointer will be updated, but there may be circumstances where it is not appropriate to update the stack pointer, and accordingly this optional update field provides the flexibility for either leaving the stack pointer at its current value, or updating it to take account of the return state data written to the stack.

In preferred embodiments, different types of stack may be provided, which use different address modes for determining how the stack pointer is updated. Examples of four different stack types are:

Full Ascending—The stack grows upwards in memory and the stack pointer points to the last word pushed onto the stack;

Empty Ascending—The stack grows upwards in memory and the stack pointer points one word above the last word pushed onto the stack;

Full Descending—The stack grows downwards in memory and the stack pointer points to the last word pushed onto the stack; and Empty Descending—The stack grows downwards in memory and the stack pointer points one word below the last word pushed onto the stack.

Hence, in preferred embodiments the return state data processing instruction includes an address mode field for identifying the address mode of the stack to which the return state data is to be written, this field being used by the processing unit to determine the address mode relevant to the destination stack.

Depending on the exception occurring and other system state, it may be necessary to always invoke the return state data processing instruction, or instead to only invoke the return state data processing instruction if a particular condition exists. Accordingly, in preferred embodiments, the return state data processing instruction includes a condition field for specifying a condition for execution of the return state data processing instruction, such that the return state data processing instruction is only executed by the processing unit if the condition is met.

In preferred embodiments, when an exception occurs, the processing unit will be placed into a corresponding exception mode of operation, and hence as an example, if an interrupt occurs, the processing unit will be placed into an interrupt mode of operation, if an abort occurs, the processing unit will be placed into an abort mode of operation, etc. Accordingly, the current mode of operation at the time the return state data processing instruction is executed is an exception mode of operation. In a preferred embodiment, the different mode of operation whose stack is used to store the return state data is a privileged mode of operation, for example a system wide privileged mode of operation. In an alternative embodiment, the different mode of operation may be the mode of operation of the processing unit prior to entry into the exception mode.

It will be appreciated that the return state data may take a variety of forms. However, in preferred embodiments, the return state data comprises a saved program counter and a saved processor status, these being the program counter and processor status of the mode of operation which was exited to enter the current, i.e. exception, mode of operation.

Viewed from a second aspect, the present invention provides a method of operating a data processing apparatus comprising a processing unit for executing data processing instructions, the processing unit having a plurality of modes of operation, each mode of operation having a corresponding stack for storing data associated with that mode, the method comprising the step of: causing the processing unit to respond to a return state data processing instruction by writing return state data of the processing unit from its current mode of operation to a stack corresponding to a different mode of operation to the current mode of operation.

Viewed from a third aspect, the present invention provides a computer program operable to configure a data processing apparatus to perform a method in accordance with the second aspect of the present invention. The invention also relates to a carrier medium comprising such a computer program. The carrier medium may be any suitable device, for example a CDROM, a diskette, etc, or indeed may be a transmission medium such as an optical fibre, radio signal, etc.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 1A:
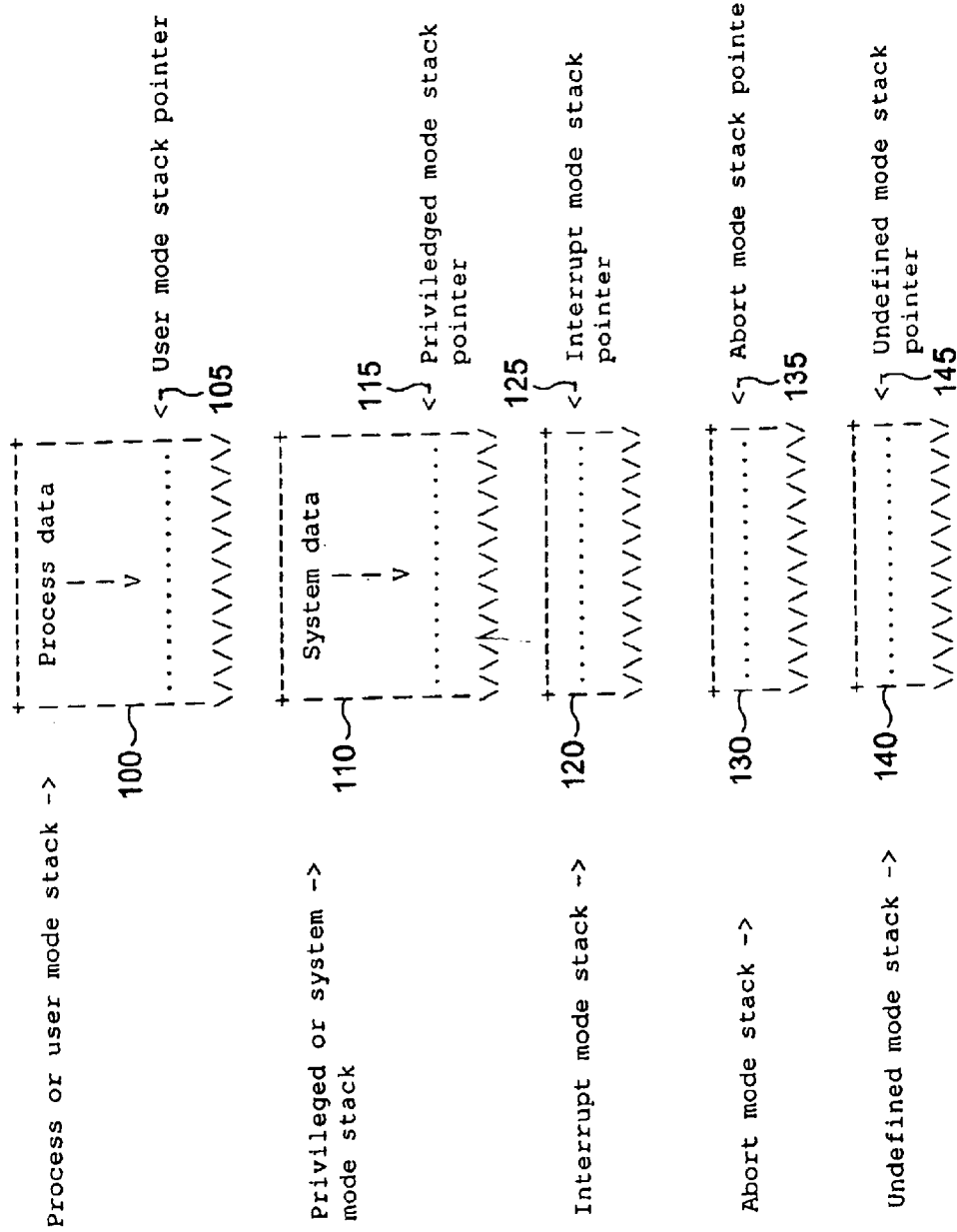
FIG. 1A is a diagram illustrating an example system configuration containing multiple stacks, each stack being associated with one or more modes of operation.
Figure 1B:
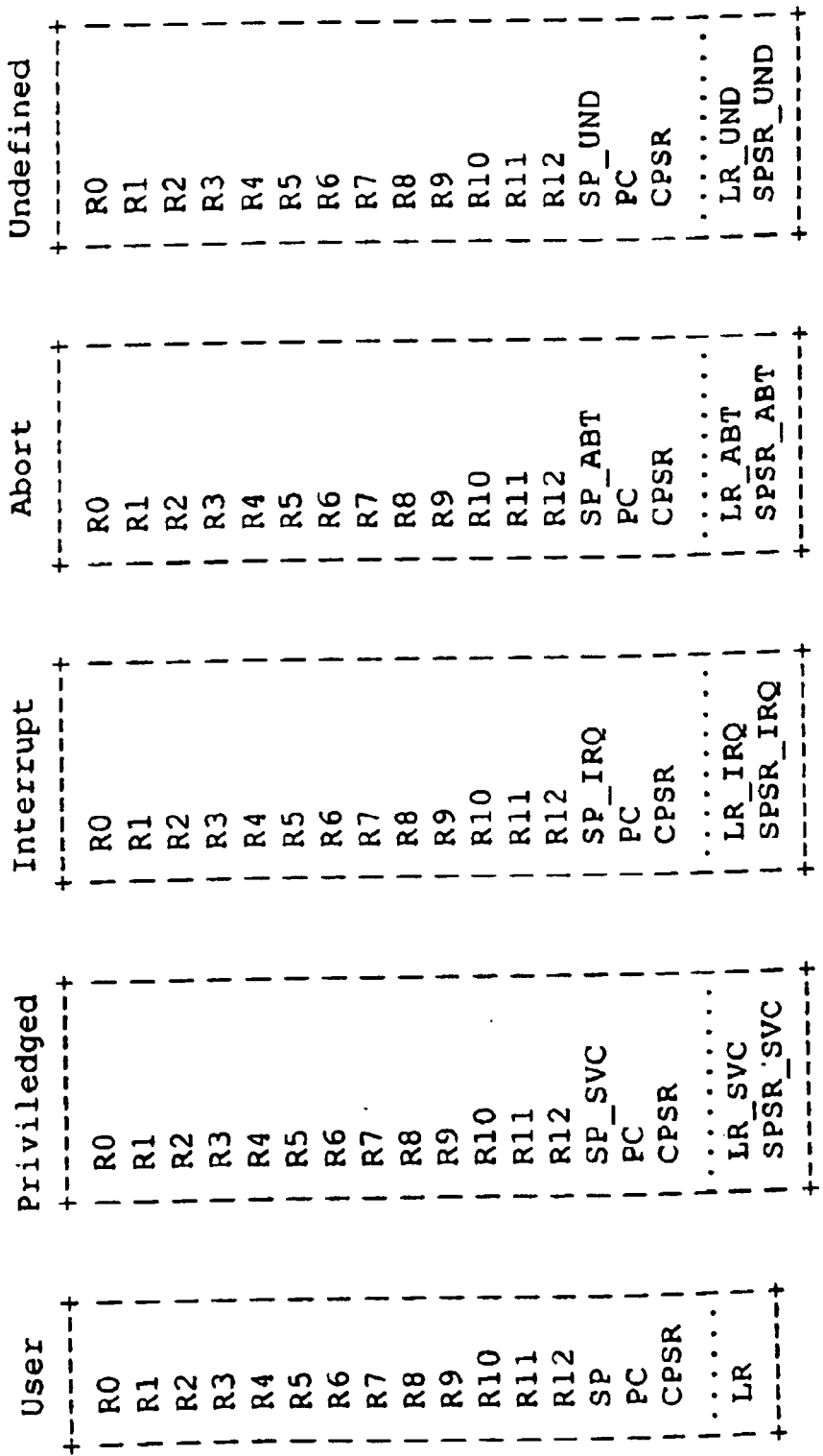
FIG. 1B illustrates the registers associated with each mode of operation in the system configuration of FIG. 1A.

FIGS. 1A and 1B are block diagrams illustrating an example system having six modes of operation and a corresponding six stacks. However, the FIQ mode is reserved for high priority interrupts which do not cause context switching, and accordingly only five modes of operation and their corresponding five stacks are shown in the figures and discussed in the following description. Hence, with reference to FIG. 1A, five stacks 100, 110, 120, 130 and 140 are illustrated. Each stack has an associated stack pointer register 105, 115, 125, 135 and 145, each stack point register being accessible only from the mode of operation associated with that stack. This becomes clear when considering FIG. 1B, which illustrates the registers accessible in each of the five modes of operation, namely a user mode, a privileged mode, an interrupt mode, an abort mode, and an undefined mode. As is clear from FIG. 1B, certain registers are accessible from any of the modes. However, the stack pointers for the five modes are named in this example as SP, SP_SVC, SP_IRQ, SP_ABT and SP_UND, and it is clear that in any particular mode of operation, the processor can only access the register containing the stack pointer for the stack associated with that mode of operation. Accordingly, the processor can only access the stack belonging to that mode of operation.

The privileged mode, and each of the exception modes (interrupt, abort and undefined) have associated return state data which is accessible only from the mode of operation associated with that return state. With reference to FIG. 1B, the return state is named as LR_SVC, LR_IRQ, LR_ABT, LR_UND and also SPSR_SVC, SPSR_IRQ, SPSR_ABT and SPSR_UND, LR standing for "Link Register", and SPSR standing for "Saved Processor Status Register". The user mode also has a link register, but this is not used for storing return state information as there is no return state for the user mode since this is not an exception mode. That is to say, there is no exception which will cause entry to user mode, and therefore there is no need for user mode to store any return state data.

Figure 2A:
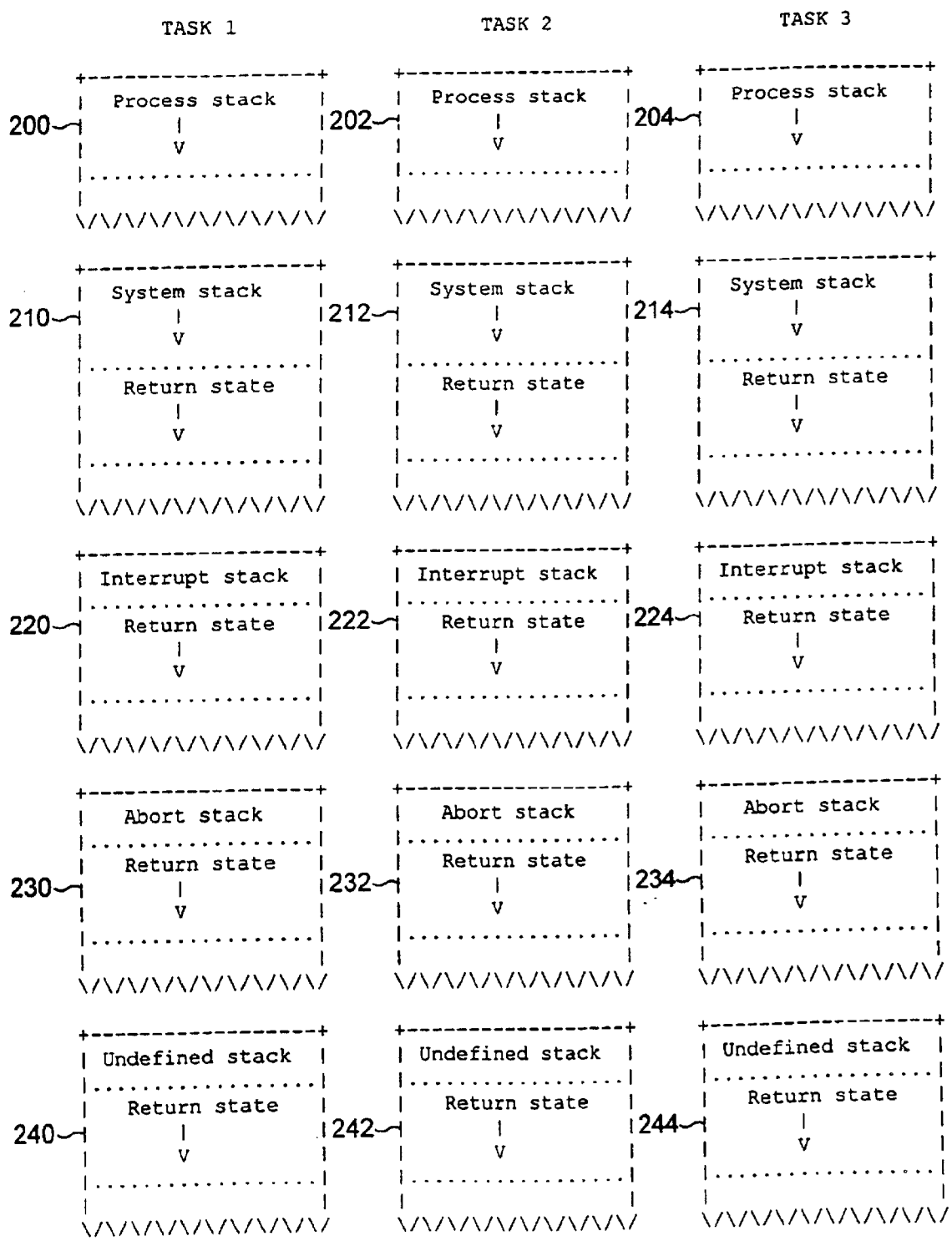
FIG. 2A shows an example known system configuration having three tasks, with each task having five separate stacks.

FIG. 2A illustrates, in block diagram form, a first prior art system configuration, in this example the system having three tasks, each task having five stacks corresponding to the five modes of operation. Accordingly, task 1 has a process stack 200, a system stack 210, an interrupt stack 220, an abort stack 230 and an undefined stack 240, task 2 has a process stack 202, a system stack 212, an interrupt stack 222, an abort stack 232 and an undefined stack 242, and task 3 has a process stack 204, a system stack 214, an interrupt stack 224, an abort stack 234 and an undefined stack 244.

Return state data is saved on the stack corresponding to the exception. For example, on occurrence of an interrupt, a task will enter the interrupt mode of operation, and the return state information will be saved on the interrupt stack. As will be appreciated from FIG. 2A, this imposes additional overhead in terms of memory consumption by having to maintain five stacks per task.

Figure 2B:
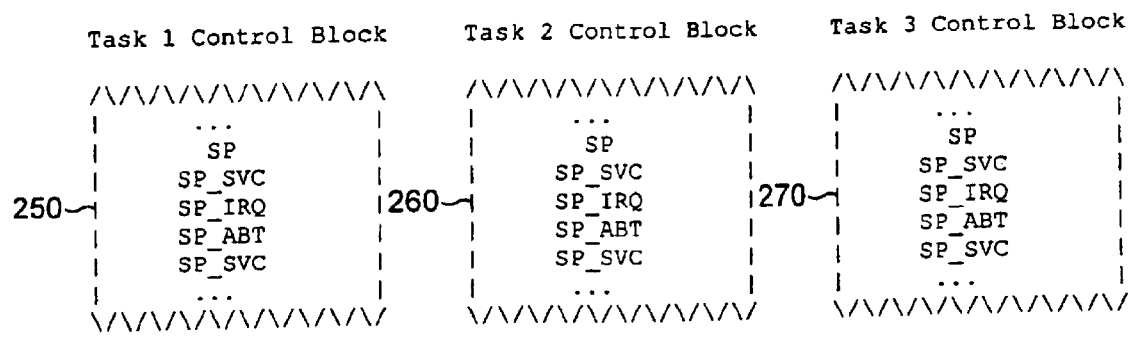
FIG. 2B shows a portion of the task control blocks associated with the system shown in FIG. 2A.

FIG. 2B shows part of the task control block for each task, a task control block being an area of memory where a task saves all the information necessary for context switching. As part of this information, the stack pointers for each of the five stacks need to be stored, and hence the control block 250 for task 1 will have to store five stack pointers, the control block 260 for task 2 will have to store five stack pointers, and the control block 270 for task 3 will have to store five stack pointers. Accordingly, it will be appreciated that having five stacks per task imposes additional overhead both in terms of memory consumption by virtue of the additional memory needed in each task control block, and performance by virtue of the additional time taken to save and restore the additional registers in the task control block.

Figure 3A:
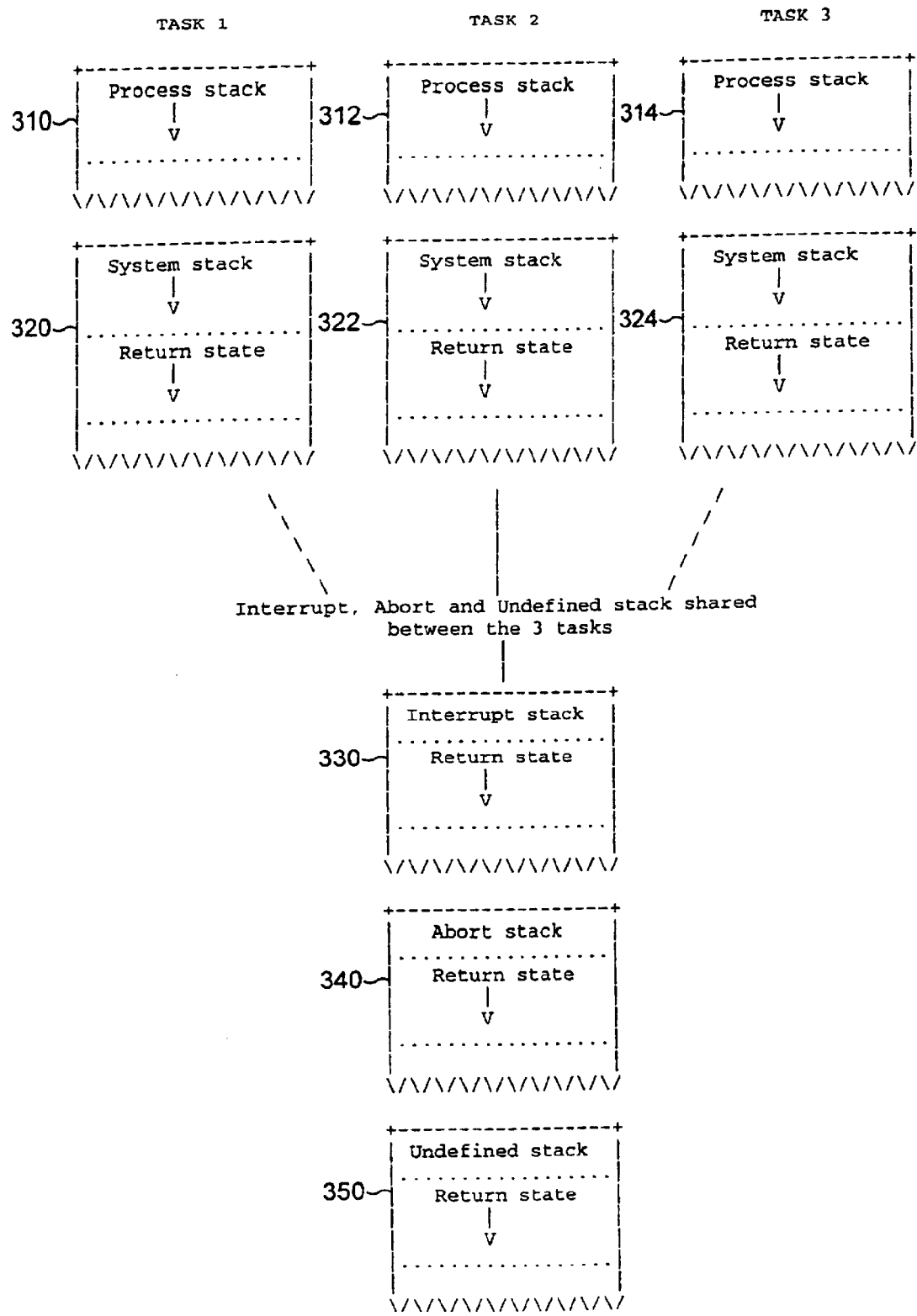
FIG. 3A shows an example known system configuration having three tasks, each task having two separate stacks but with three exception stacks beings shared between the three tasks.

With the aim of improving upon this known technique, a second, more commonly used, approach is to provide a system where certain exception stacks are shared between the task, an example of such a system being illustrated in FIG. 3A. In accordance with the example of FIG. 3A, a system is shown having 2 stacks per task, and an additional 3 stacks shared system wide between the three tasks. For the purposes of illustration, it is assumed that the system illustrated in FIG. 3A has the same five execution modes as the system illustrated in FIG. 2A, although it will be appreciated that other embodiments may have more or fewer execution modes.

On occurrence of an exception, any data on the corresponding exception stack is transferred to either the user/process stack or the system stack of the relevant task, thereby ensuring that all of the shared exception stacks remain empty at all points where a context switch may be required. As a result of this, it is only necessary to store the stack pointers for the user/process and system modes in the corresponding task control block, this being illustrated by FIG. 3B which shows the task control blocks 360, 370 and 380 for tasks 1, 2 and 3 respectively.

Figure 3B:
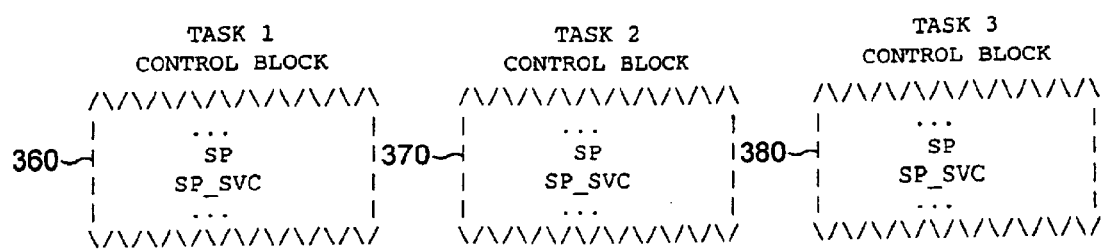
FIG. 3B shows a portion of the task control blocks associated with the system shown in FIG. 3A.

As will be apparent from FIGS. 3A and 3B, significant advantages are obtained through use of this approach in terms of memory consumption and performance. The system illustrated in FIGS. 3A and 3B requires Nt×2+3 stacks, whereas the system illustrated in FIGS. 2A and 2B requires Nt×5 stacks, where Nt is the number of tasks in the system. Further, the system illustrated in FIGS. 2A and 2B requires Nt×5 words of context block information, whereas the system illustrated in FIGS. 3A and 3B requires Nt×2 words of context block information. In performance terms, a context switch between tasks on a system as illustrated in FIGS. 2A and 2B requires five word loads and stores, whereas a context switch between tasks on the system as illustrated in FIGS. 3A and 3B requires two word loads and stores.

To provide an example of the code necessary at the start of an interrupt to implement the system illustrated in FIGS. 3A and 3B using a known technique, set out below is a code fragment written in ARM assembler:

```
; First save the return state (lr and spsr registers) on the
; interrupt stack. In addition to the return state also save R0 for
; use as a temporary register. Do not decrement the stack pointer
; because we will be loading the return state and saved R0 off the
; interrupt stack as soon as we change mode. It is safe to not
; decrement the stack pointer because we know no interrupts can be
; serviced between saving the data and reading it after changing
; modes because interrupts are disabled.
(D)   SUB    lr, lr, #4        ; Adjust LR_IRQ to point to return
                                 address
(M)   STR    lr, [sp, #-4]     ; Save LR_IRQ on interrupt stack
(D)   MRS    lr, spsr          ; Read SPSR_IRQ
(M)   STR    lr, [sp, #-8]     ; Save SPSR_IRQ on interrupt stack
(M)   STR    r0, [sp, #-12]    ; Save R0 on interrupt stack
(D)   MOV    r0, sp            ; Get interrupt stack pointer in R0
; Now change processor mode to system (SVC) mode.
(D)   MRS    lr, cpsr          ; Read current processor status
                                 register
(D)   BIC    lr, lr, #0x1f     ; Mask out mode bits using Bit Clear
                                 operation
(D)   ORR    lr, lr, #0x13     ; Or in the correct mode bits for SVC
                                 mode
(D)   MSR    cpsr_c, lr        ; Write the new mode to the cpsr.
; Now save a register on the SVC stack so we can use it as a
; temporary. Then recover the return state information and saved R0
; from the interrupt stack and save it on the SVC stack.
(D)   SUB    sp, sp, #8*4      ; First create space on the SVC stack
(M)   STR    r1, [sp, #2*4]    ; Save R1 for use as a temporary
                                 register
(M)   LDR    r1, [r0, #-4]     ; Recover saved LR_IRQ to R1
(M)   STR    r1, [sp, #7*4]    ; Save LR_IRQ on SVC stack
(M)   LDR    r1, [r0, #-8]     ; Recover saved SPSR_IRQ to R1
(M)   STR    r1, [sp, #0*4]    ; Save SPSR_IRQ on SVC stack
(M)   LDR    r1, [r0, #-12]    ; Recover saved R0 from interrupt
                                 stack
; At this point it is save to re-enable interrupts. At no previous
; point was it safe to do so because there was data stored on the
; interrupt stack which could be overwritten if a second interrupt
; was allowed to be serviced before we had recovered all the data
; from the interrupt stack.
```

-continued

```
(D)   MRS    r0, cpsr          ; Read the CPSR
(D)   BIC    r0, r0, #0x80     ; Clear the interrupt disable bit
(D)   MSR    cpsr_c, r0        ; And write back the CPSR
; *** INTERRUPT RE-ENABLE ***
; Cycle count before RE-ENABLING interrupts = 11 * D + 9 * M
;
; We can now continue saving the remainder of the process context
      STR    r1, [sp, #1*4]    ; Save R0 recovered from IRQ stack
      STR    r2, [sp, #3*4]    ; Save R2 on SVC stack
      STR    r3, [sp, #4*4]    ; Save R3 on SVC stack
      STR    R12, [sp, #5*4]   ; Save R12 on SVC stack
      STR    lr, [spc, #6*4]   ; Save LR_SVC on SVC stack
      . . .                    ; Now continue and service the
                                 interrupt
```

The letter in parenthesis next to each instruction shows the number of memory or data cycles required for each instruction, where M equals one memory cycle, and D equals one data cycle. The number of cycles are illustrated up to the point marked "*INTERRUPT RE-ENABLE*", which is the point where interrupts can be re-enabled. The number of cycles between the start of the interrupt handler and this point determines the interrupt latency, a high number of cycles leading to a high interrupt latency, whilst a low number of cycles leads to a low interrupt latency. Not shown in the code fragment above are a number of additional cycles required by the hardware to deliver control to the first instruction of the interrupt handler. This number of cycles is the same with or without the use of preferred embodiments of the present invention, and so is omitted here for clarity.

To help illustrate the process being performed by the various instructions illustrated in the above code fragment, FIGS. 4A to 4E are enclosed, and these figures will now be discussed.

In this example, it is assumed that an interrupt exception has occurred and accordingly the processor has entered an interrupt mode of operation, where it has access to registers 420. The return state data of the processor from this interrupt mode of operation is stored in the return state registers, identified in FIG. 4A as registers 430. In particular, the return state data comprises the registers LR_IRQ and SPSR_IRQ.

Figure 4A:
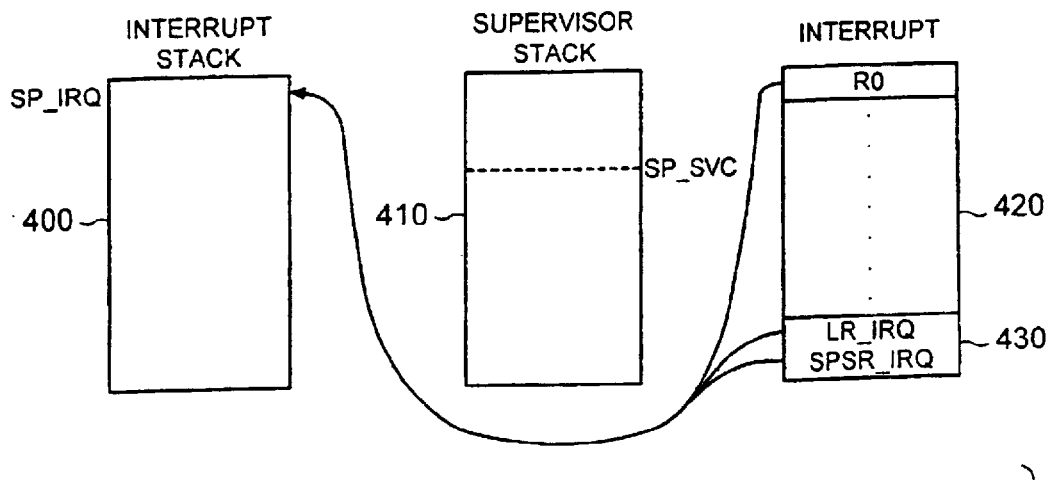
FIGS. 4A to 4E illustrate a sequence of instructions invoked upon occurrence of an exception in accordance with a prior art approach.

FIG. 4A also illustrates two of the stacks, namely the interrupt stack 400 accessible from the interrupt mode of operation, and the supervisor stack 410, the supervisor stack 410 not being accessible from the interrupt mode of operation, since in the interrupt mode of operation the processor is unable to access the register containing the supervisor stack pointer SP_SVC.

The first process that needs to be performed is to save the return state, i.e. the contents of registers 430, onto the interrupt stack 400. In addition to saving the return state, the contents of register RØ are also saved to the interrupt stack 400, so that register RØ can be used as a temporary register. This operation is performed by the four instructions identified by the reference 435 in FIG. 4A and set out in the above code fragment. The initial SUB instruction set out in the above code fragment is merely required since in the disclosed implementation the link register LR_IRQ needs to be adjusted in order for it to correctly point to the return address.

Figure 4B:
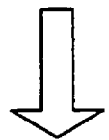
Figure 4B:
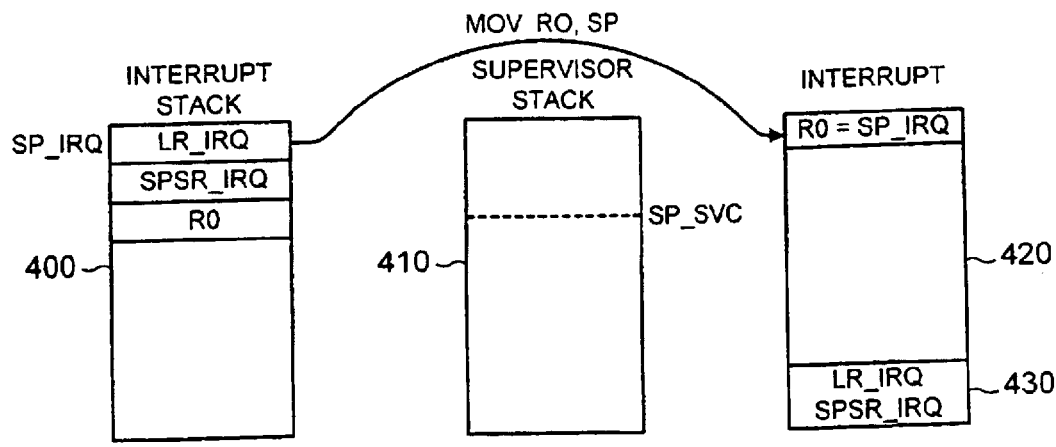

Accordingly, with reference to FIG. 4B, we are now at a point where the contents of LR_IRQ, SPSR_IRQ and RØ are stored on the interrupt stack 400. The stack pointer SP_IRQ of the interrupt stack 400 is not decremented, because the return state and R∅ data just saved on the interrupt stack will be loaded off the interrupt stack as soon as the process changes mode. It is safe to not decrement the stack pointer because it is not possible for any further interrupts to be serviced between saving the data and reading it after changing modes, because at this time interrupts are disabled.

As illustrated in FIG. 4B, the next step is to store the stack pointer SP_IRQ of the interrupt stack into register R∅, which is now being used as a temporary register. This will enable that stack pointer to be accessible once the interrupt mode of operation is exited.

Figure 4C:
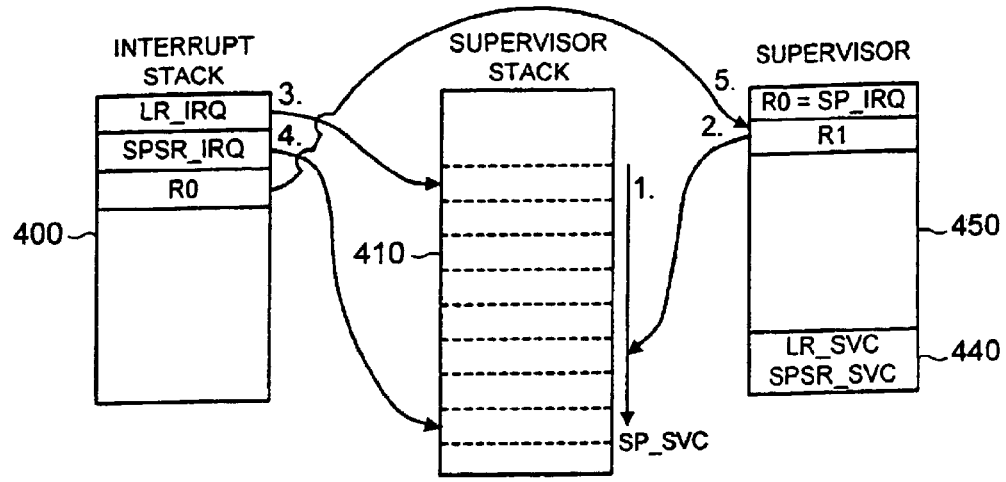

At this point, the processor mode is changed to the system mode, this being performed by the four instructions referenced by reference numeral 445 in FIG. 4B. Accordingly, as shown in FIG. 4C, the processor is now in the supervisor mode of operation, where it has access to the registers 450. Since register R∅ is shared between the modes of operation, register R∅ still contains the stack pointer for the interrupt stack 400. However, the return state is now the return state of the processor from the supervisor mode of operation, as stored in registers 440.

The process now stores the content of one of the registers on the supervisor stack, so that it can be used as a temporary register. In this example, the contents of register R1 are stored onto the supervisor stack. The process then recovers the return state information and the saved R∅ value from the interrupt stack 400, and saves it onto the supervisor stack 410. These processes are performed by the seven instructions referenced by numeral 455 in FIG. 4C. In particular, the SUB instruction is used to decrement the supervisor stack pointer by eight 4 byte words. Then, a STR instruction is used to store the contents of R1 into a particular location in the supervisor stack 410. An LDR and STR instruction is then used to store LR_IRQ into a particular location on the supervisor stack, with the following LDR and STR instruction being used to store SPSR_IRQ into a particular location on the supervisor stack. It can be seen that the temporary register R1 is used for this purpose. The final LDR instruction is used to store the value of R∅ stored on the interrupt stack 400 into the temporary register R1. However, the subsequent STR instruction required to then store that value onto the supervisor stack is not immediately performed, since at this point it is now safe to re-enable interrupts, and the re-enablement of interrupts is given priority in order to minimise the interrupt latency. It should be noted that at no previous point was it safe to re-enable interrupts since there was data stored on the interrupt stack 400 which could be overwritten if a second interrupt was allowed to be serviced before all of that data had been recovered from the interrupt stack 400.

Figure 4D:
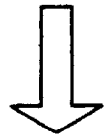
Figure 4D:
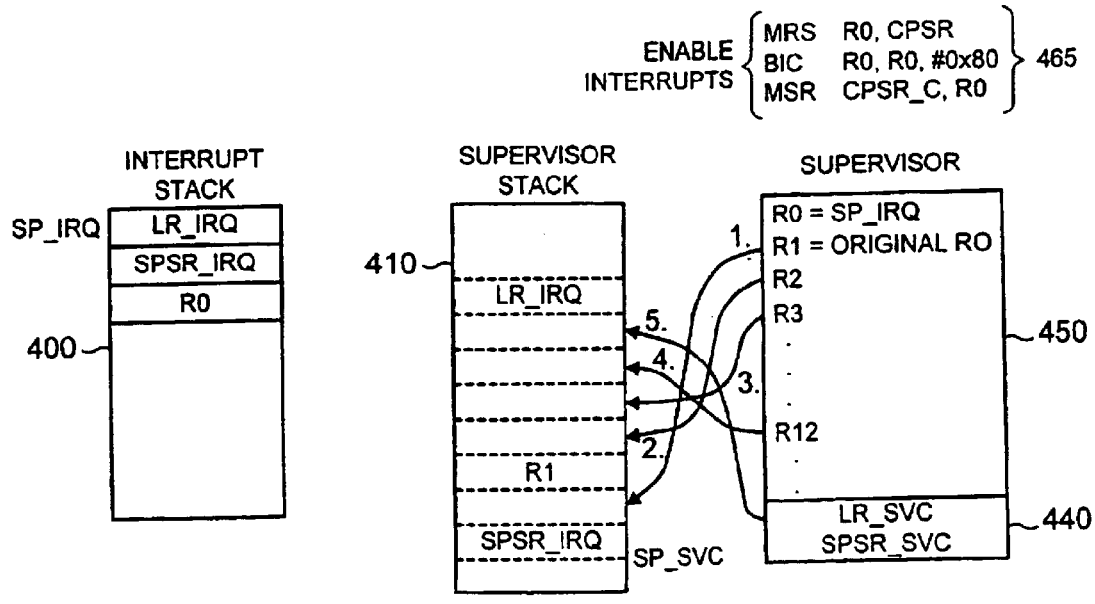

Accordingly, transitioning now to FIG. 4D, the enablement of interrupts is performed by the three instructions referenced by the numeral 465 in FIG. 4D, and included in the earlier code fragment. In effect, these instructions read the CPSR register, clear the interrupt disable bit, and then write back the relevant data to the CPSR register, thereby re-enabling interrupts.

At this point, we can now continue saving the remainder of the process context, this being performed by the five STR instructions referenced by the numeral 475 in FIG. 4D. In particular, it should be noted that the first STR instruction stores the contents of R1 into a specified location in the supervisor stack, this register actually containing the original R∅ data, the contents of R1 having already been moved into the supervisor stack by one of the instructions executed in FIG. 4C. The contents of registers R2, R3, R12 and LR_SVC are then also moved to the supervisor stack. 410. It should be noted that the contents of the other registers will automatically be saved by any code subsequently called which obeys the ATPCS (ARM Thumb Procedure Calling Standard), and accordingly do not need to be explicitly saved to the supervisor stack at this point (unless the code does not obey the ATPCS).

Figure 4E:
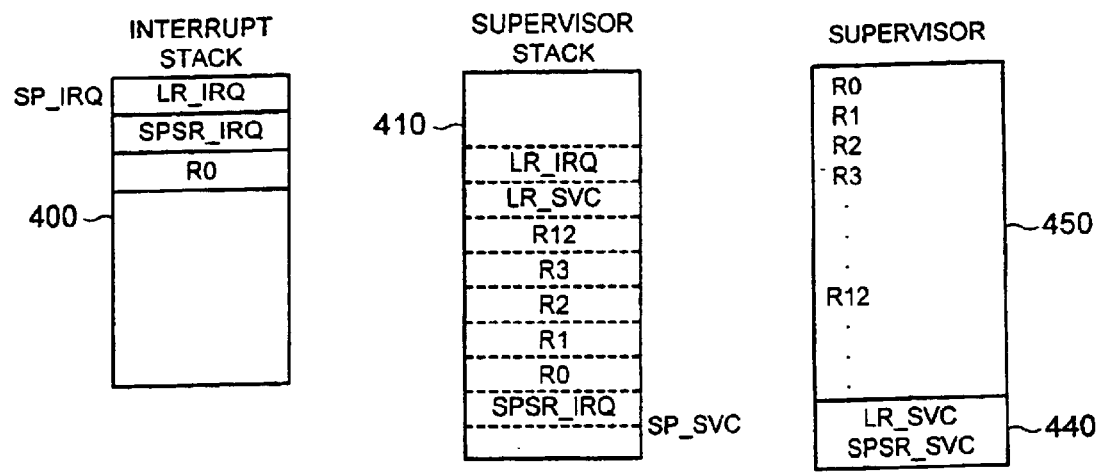

FIG. 4E then illustrates the final state of the supervisor stack 410 at this point. It should be noted that in FIGS. 4D and 4E, the interrupt stack 400 is still shown as containing the three pieces of data originally moved to the interrupt stack in FIG. 4A. However, it will be clear that this data is now redundant since it is stored on the supervisor stack, and accordingly to all intents and purposes the interrupt stack 400 can be considered to be empty. Accordingly, at this point, it is now safe to continue and service the interrupt, this typically taking place via a context switch to another task.

As can be seen, using this known prior art technique, the interrupt handler takes eleven D type cycles and nine M type cycles before interrupts can be re-enabled, leading to a relatively high interrupt latency. Also significant is the number of instructions taken before interrupts can be re-enabled. As can be seen from the above enclosed code fragment in combination with FIGS. 4A to 4E, twenty instructions need to be executed before interrupts can be re-enabled using this prior art approach.

Having now described the process necessary at the start of an interrupt to implement a system such as that show in FIGS. 3A and 3B in accordance with known prior art techniques, a discussion will now follow of the process necessary at the start of an interrupt to implement such a system in accordance with preferred embodiments of the present invention. In particular, to assist in the discussion, there is set out below a code fragment illustrating the code necessary at the start of an interrupt to implement a system such as that shown in FIGS. 3A and 3B in accordance with a preferred embodiment of the present invention:

```
; Save the return state directly onto the SVC stack using the SRS
; instruction.
(D)    SUB      lr, lr, #4          ; Adjust LR_IRQ to point to return
                                      address
(2M)   SRSDB    sp_svc!             ; Save return status on SVC stack
; Now change processor to system (SVC) mode, re-enabling interrupts
; at the same time. It is safe to re-enable interrupts at this time
; because the return state has been saved on the SVC stack. Therefore
; the interrupt stack is empty and a context switch is permissible
; without the need to context switch the interrupt stack (i.e.
; without the need to have a separate interrupt stack per task).
(D)    MRS      lr, cpsr            ; Read cpsr
(D)    BIC      lr, lr, #0x1f+0x80  ; Mask out mode bits and
                                      clear interrupt
(D)    ORR      lr, lr, #0x13       ; Or in mode bits for SVC
                                      mode
(D)    MSR      cpsr_c, lr          ; Write back new mode and
                                      interrupt bits
; *** INTERRUPT RE-ENABLE ***
; Cycle count before RE-ENABLING interrupts = 5 * D + 2 * M
;
; Interrupts are now re-enabled. Continue to save the remainder of
; the process context.
       STMDB sp!, {r0–r3, r12, lr}
       . . .                        ; Now continue and service the
                                      interrupt
```

As with the earlier discussed prior art code fragment, the letters in parenthesis show the number of cycles, the letters 2M next to the SRSDB instruction indicating two memory cycles.

This code fragment will be discussed below in association with FIGS. 5A to 5D which schematically illustrate the processes performed by the various instructions in the above code fragment.

Figure 5A:
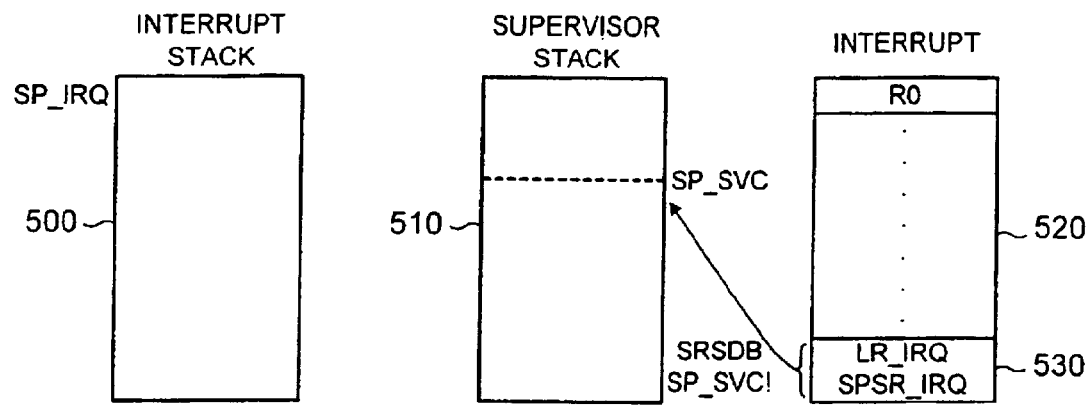
FIGS. 5A to 5D illustrate a sequence of instructions performed upon occurrence of an exception in accordance with preferred embodiments of the present invention.

In this example, as with the example discussed earlier with reference to FIGS. 4A to 4E, it is assumed that an interrupt exception has occurred and that accordingly the processor has entered an interrupt mode of operation where is has access to registers 520. The return state data of the processor from this interrupt mode of operation is stored in return state registers, indicated in FIG. 5A as registers 530. FIG. 5A also shows the interrupt stack 500 and the supervisor stack 510.

The code fragment starts with a SUB instruction identical to that included in the prior art code fragment discussed earlier, as mentioned earlier this instruction being required to ensure that the interrupt link register LR_IRQ points to the correct return address.

Then, a new instruction provided in accordance with preferred embodiments, namely an SRS instruction, is performed to directly save the return state data onto the supervisor stack 510 whilst operating in the interrupt mode of operation. The format of this instruction will be discussed in detail later. However, it should be noted here that the letters DB are appended to the SRS instruction to denote the address mode of the supervisor stack, in this example "Decrement Before". The instruction also includes a field identifying the stack to which the return state data is to be saved, this field in this example containing the stack pointer SP_SVC for the supervisor stack 510. Finally, the exclamation mark at the end of the instruction indicates that the stack pointer should be updated once the return state data has been saved.

Figure 5B:
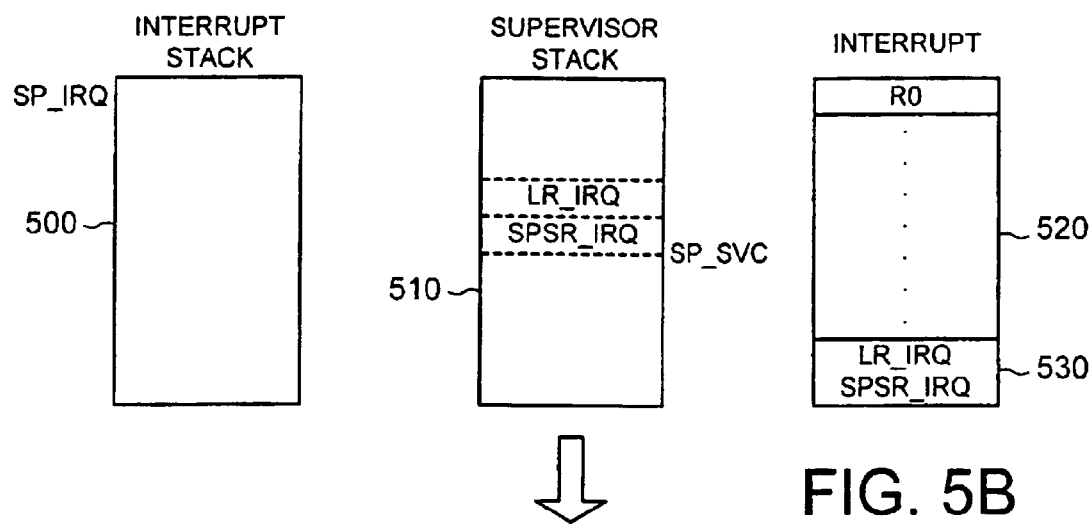

Once the SRS instruction has been executed, the contents of the interrupt stack and supervisor stack are as illustrated in FIG. 5B. In particular, it should be noted that the contents of registers LR_IRQ and SPSR_IRQ have been added to the supervisor stack 510, and the supervisor stack pointer SP_SVC has been updated. At this stage, since the contents of the return state data from the interrupt mode of operation have been stored onto the supervisor stack, it is now possible to change the mode of operation of the processing unit to the supervisor mode. Further, since this return state data is stored directly on the supervisor stack 510, and the interrupt stack 500 has remained empty, it is now safe to re-enable interrupts at this time. Since the interrupt stack 500 is empty, a context switch is permissible without the need to context switch the interrupt stack, i.e. without the need to have a separate interrupt stack per task, and accordingly this process can be employed within a system such as that shown in FIG. 3A and 3B.

Figure 5C:
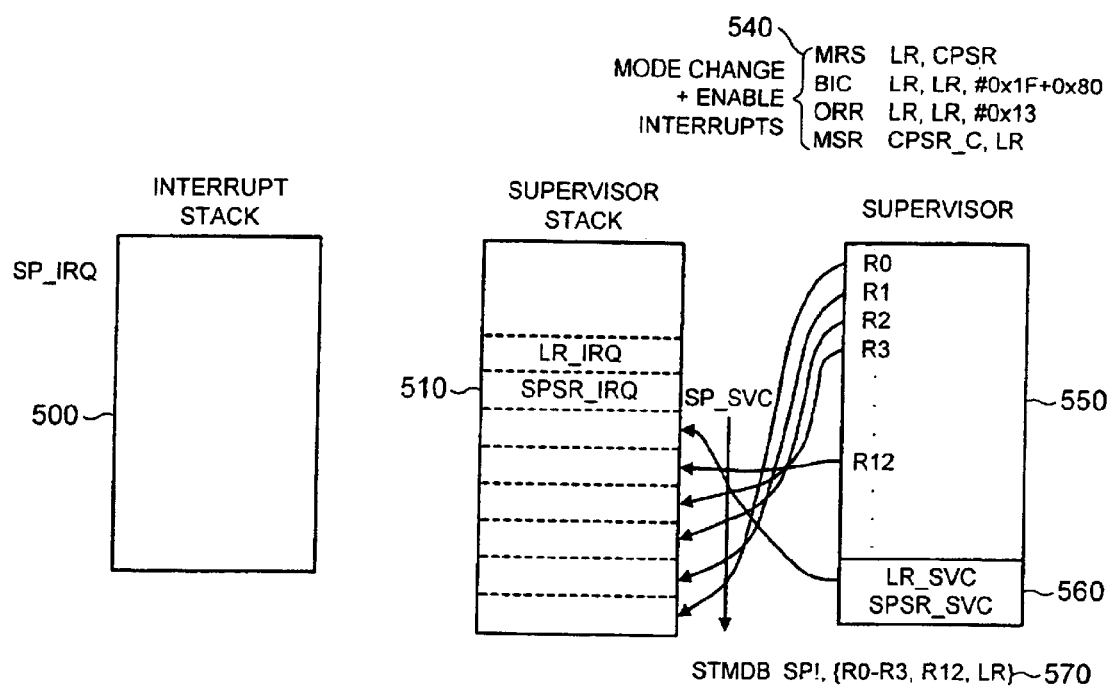

The four instructions used to change the mode of operation and re-enable interrupts are referenced by the numeral 540 in FIG. 5C. FIG. 5C then shows the registers 550 accessible from the supervisor mode of operation, including the registers 560 containing the return state from the supervisor mode of operation.

At this point, the process can continue to save the remainder of the process context. Since the registers involved can be stored in sequential locations of the supervisor stack, it is possible to perform this operation via a single STM instruction, this instruction being referenced by the reference numeral 570 in FIG. 5C, and the process being illustrated schematically by the various lines between the supervisor registers 550 and the supervisor stack 510. The letters DB appended to the STM instruction identify that the supervisor stack is operating in Decrement Before address mode, the exclamation mark after the stack pointer ID in the STM instruction indicating that the stack pointer should be adjusted. The registers to be stored are then identified in the instruction.

Figure 5D:
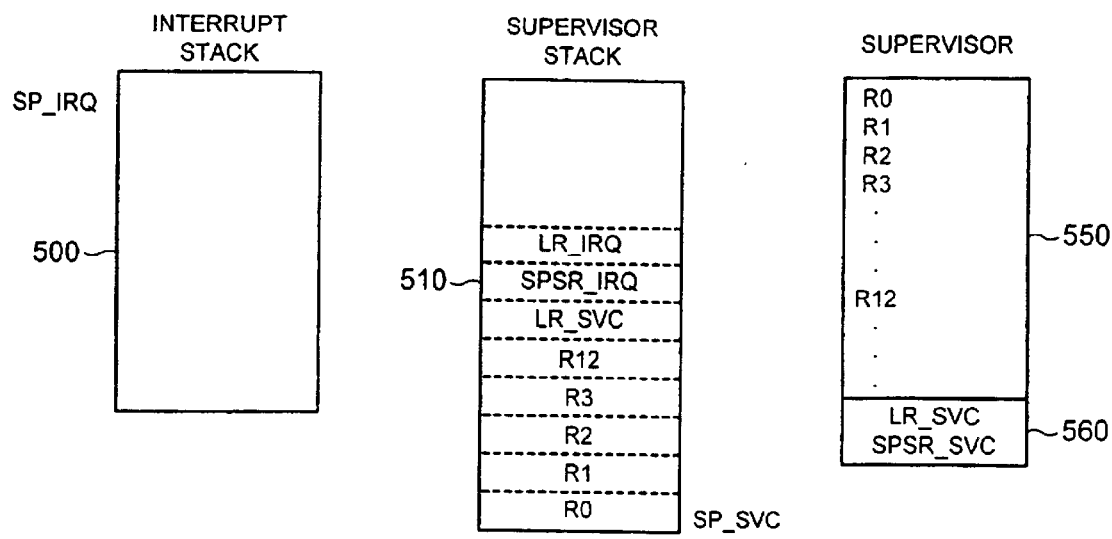

FIG. 5D illustrates the content of the supervisor stack 510 after the STM instruction has been performed. It will be noted that the contents of the supervisor stack 510 are the same as the contents of the supervisor stack 410 illustrated earlier with reference to FIG. 4E, albeit with a slightly different ordering of the data, and accordingly it can be seen that the process of preferred embodiments illustrated with reference to FIGS. 5A to 5D produces the same result as the prior art process illustrated with reference to FIGS. 4A to 4E. However, as is apparent from the code fragment enclosed earlier, the technique of the preferred embodiment, which incorporates the new SRS instruction, ensures that the interrupt handler only takes five D type cycles and two M type cycles before interrupts can be re-enabled. Comparing the number of instructions taken before interrupts can be re-enabled, the interrupt handler using the approach of the preferred embodiment only needs to execute six instructions before re-enabling interrupts, as opposed to the twenty instructions that needed to be performed in accordance with the prior art approach.

Hence, overall, when using the approach of the preferred embodiment of the present invention, the interrupt handler takes fewer D type cycles, fewer M type cycles and fewer instructions. It should also be noted that M type cycles may be much slower than D type cycles on a slow memory system and also that for each instruction executed there may be an additional memory fetch performed to fetch the instruction itself.

Accordingly, taking an example system where an M type cycle is four times slower than a D type cycle, this gives the following performance figures for the interrupt handler with and without use of the technique of the preferred embodiment, where in the following equations, (D) represents the number of data cycles, (M) represents the number of memory cycles, and (I) represents the number of instructions executed each of which may incur an additional memory fetch:

Without the technique of the preferred embodiment:

$$11(D)+9(M)*4+20(I)*4=127 \text{ cycles}$$

With the technique of the preferred embodiment:

$$5(D)+2(M)*4+6(I)*4=37 \text{ cycles}$$

Having illustrated the benefits of employing the approach of the preferred embodiment of the present invention, the new SRS instruction will now be discussed in more detail. In particular, an abbreviated Backus-Naur form description of the SRS instruction of preferred embodiments of the present invention is provided below:

SRS { <COND> } <addr_mode> <fully_qualified_stack_pointer> { ! }
<COND> : : =
    EQ | NE | CS | CC | MI | PL | VS | VC | HI | LS | GE |
    LT | GT | LE | AL | HS | LO
<addr_mode> : : =
    IA | IB | DA | DB | FD | ED | FA | EA
<fully_qualified_stack_pointer> : : =
    SP_USER | SP_FIQ | SP_IRQ | SP_SVC | SP_ABT | SP_UND

| <COND> | Description | Condition |
|---|---|---|
| EQ | EQuals | Z |
| NE | Not Equal | !Z |
| CS | Carry Set | C |
| HS | unsigned Higher or Same | C |
| CC | Carry Clear | !C |
| LO | unsigned Lower | !C |
| MI | MInus | N |
| PL | Plus | !N |
| VS | oVerflow set | V |

-continued

| | | |
|---|---|---|
| VC | oVerflow clear | !V |
| HI | unsigned HIgher | C & !Z |
| LS | unsigned Lower or Same | !C \| Z |
| GE | Greater or Equal | ! (N ^ V) |
| LT | Less Than | N ^ V |
| GT | Greater Than | !Z & ! (N ^ V) |
| LE | Less than or Equal | Z \| (N ^ V) |
| AL | ALways | 1 |
| <addr_mode> | Description | |
| IA | Increment After (equivalent to EA) | |
| EA | Empty Ascending (equivalent to IA) | |
| IB | Increment Before (equivalent to FA) | |
| FA | Full Ascending (equivalent to IB) | |
| DB | Decrement Before (equivalent to FD) | |
| FD | Full Descending (equivalent to DB) | |
| DA | Decrement After (equivalent to ED) | |
| ED | Empty Descending (equivalent to DA) | |
| <fully_qualified_stack_pointer> | Description | |
| SP_USER | The User mode stack pointer | |
| SP_FIQ | The Fast Interrupt Request stack pointer | |
| SP_IRQ | The Interrupt ReQuest stack pointer | |
| SP_SVC | The Supervisor stack pointer | |
| SP_ABT | The Abort stack pointer | |
| SP_UND | The Undefined stack pointer | |

The abbreviated Backus-Naur form should be familiar to those skilled in the art. However, a brief description is given here. In the abbreviated form, items in braces "{. . . }" indicate optional items, items in angle brackets "<. . . >" indicate replacement symbols which may be replaced with the expansion of the symbol described in the figure. The symbol "|" is used to separate symbols in a list of symbols and may be read as "or" indicating that precisely one of those symbols may be used as a replacement symbol.

Hence, it can be seen that the SRS instruction saves the return state of the processor to a stack specified by <fully_qualified_stack_pointer> which specifies a stack belonging to one of the available modes on the processor. If the <fully_qualified_stack_pointer> is followed with the "!" symbol, this indicates that the <fully_qualified_stack_pointer> will be updated after the operation is complete.

Considering the example of an ARM processor, six modes of operation are provided, namely a user mode, a supervisor mode, an abort mode, an undefined mode, and two interrupt modes, namely IRQ and FIQ, and accordingly as illustrated in the above abbreviated Backus-Naur form, the <fully_qualified_stack_pointer> may take any of the values SP_USER, SP_FIQ, SP_IRQ, SP_SVC, SP_ABT or SP_UND.

<COND> specifies one of a number of conditions which must be true in order for the operation to execute. The CPSR register accessible by the processor contains four flags, referred to hereafter as N, Z, V, C. The flag N is set to one if the result of the last arithmetic operation was negative, the flag Z is set to one if the result of the last arithmetic operation was zero, the flag V is set to one if the result of the last arithmetic operation overflowed, and the flag C is set to one if the result of the last arithmetic operation resulted in a carry. In the above abbreviated Backus-Naur form of the SRS instruction, a table is provided illustrating the various values that the <COND> field may take, along with a description of each value, and a determination as to what this equates to in terms of the N, Z, V and C flags available in the CPSR register. Thus, that table in effect describes how the processor will determine whether to execute the instruction based on the N, Z, V and C flags present in the CPSR register. As an example, if the <COND> field is set to the value MI, then the processor will check to see whether the flag N has been set to one and if so will execute the instruction, otherwise, the instruction will not execute. If the <COND> field is not specified, this is equivalent to specifying a <COND> symbol of "AL", indicating that the operation should always be executed.

The <addr_mode> field specifies an addressing mode for the operation, the various addressing modes available in the preferred embodiment being set out above in association with the abbreviated Backus-Naur form of the instruction. As mentioned earlier, the <fully_qualified_stack_pointer> field specifies the fully qualified name of a stack pointer belonging to one of the execution modes of the processor.

The following are examples of SRS instructions that may be derived from the abbreviated Backus_Naur form:

| | |
|---|---|
| SRSDB | SP_SVC! |
| SRSEQDB | SP_SVC! |
| SRSEQDB | SP_SVC |

Figure 6:
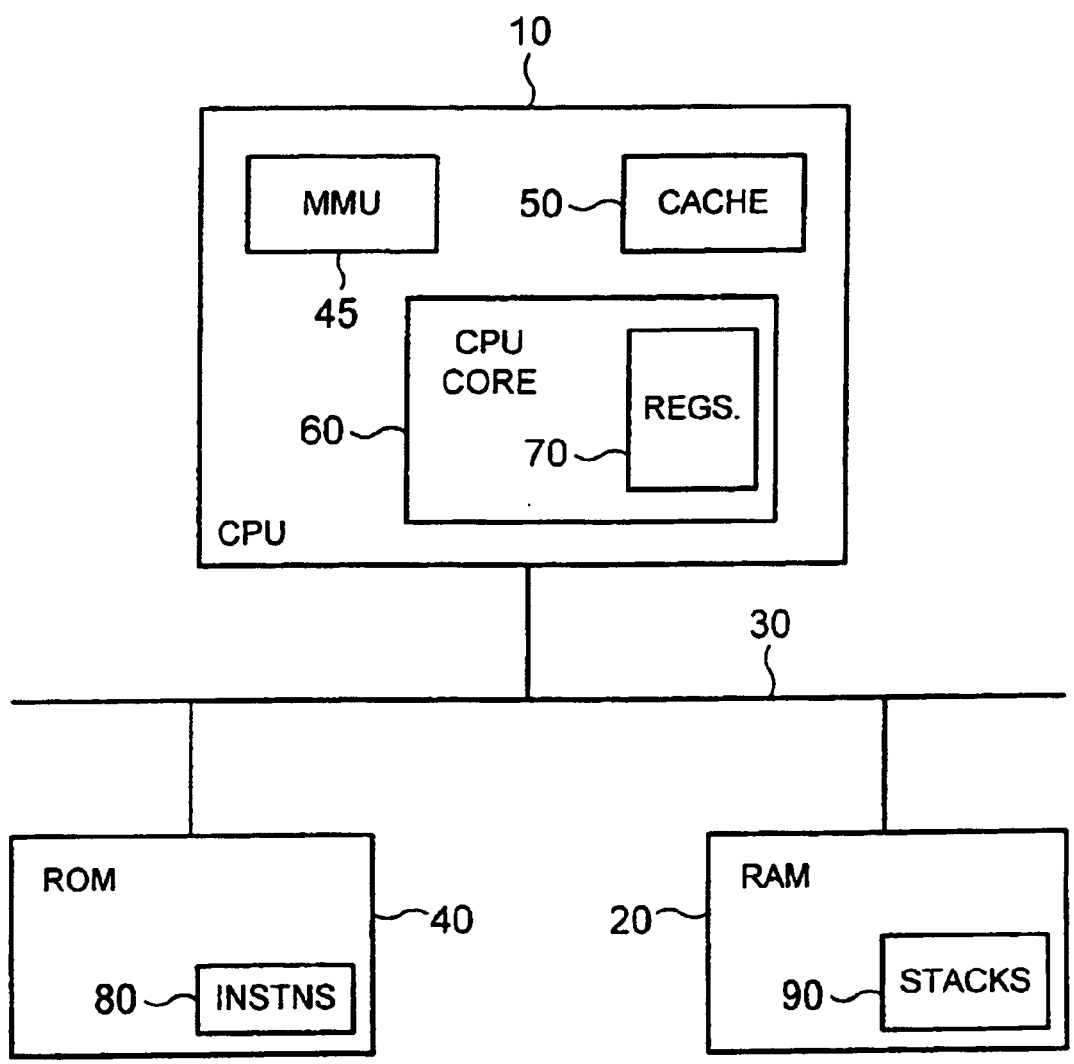
FIG. 6 is a block diagram illustrating an example structure of a system incorporating a data processing apparatus in accordance with preferred embodiments of the present invention.

FIG. 6 is a block diagram illustrating a system incorporating a data processing apparatus in accordance with preferred embodiments of the present invention. In preferred embodiments, the data processing apparatus takes a form of a CPU core 60 provided within a CPU 10. The CPU core 60 will incorporate a processing unit for executing data processing instructions, and a set of registers 70 accessible by that processing unit. The CPU 10 will typically include the CPU core 60, and a number of other optional elements, such as a Memory Management Unit (MMU) 45 and a cache 50.

CPU 10 will typically be connected to other elements via a bus 30, and hence may be connected to a Read Only Memory (ROM) 40 and a Random Access Memory (RAM) 20. The ROM 40 may be arranged to store, amongst other things, instructions 80 to be executed by the CPU core 60. In accordance with preferred embodiments of the present invention, the stacks 90 provided for each mode of operation of the processing unit may be stored within the RAM 20.

From the above description of a preferred embodiment of the present invention, it will be appreciated that use of the preferred embodiment results in a number of advantages. Firstly, use of the preferred embodiment of the present invention enables the code size to be reduced. In the examples described earlier, it has been shown how the preferred embodiment may be used to reduce the number of instructions at the start of an interrupt handler from twenty to six. Additionally, use of the preferred embodiment will typically result in improved performance. Again, in the examples mentioned earlier, it has been shown how the preferred embodiment reduces the number of cycles at the start of the interrupt handler from 127 to 37. The reduction in the number of cycles also enables the interrupt latency to be reduced, since these cycles typically occur at a critical point where interrupts are disabled.

A further surprising advantage of employing the technique of the preferred embodiment is that it may be used to reduce power consumption of a processor, power consumption being extremely important in battery powered devices such a mobile telephones and Personal Digital Assistants (PDAs). If a system based on the examples and illustrations given earlier is considered, and it is assumed that that system is required at all times to maintain an interrupt response time of 10 microseconds in order to service a high priority interrupt, then it is clear that the system must be run at sufficient speed to ensure that, in the case of the system using the known prior art approach, 127 cycles can execute in 10 microseconds. However, if the system employs the technique of preferred embodiments of the present invention, then it only needs to be run at a sufficient speed to ensure that 37 cycles can execute in 10 microseconds. Hence, the following equations determine the minimum clock speed required:

Without the technique of preferred embodiments:

$$1.0E\text{-}5 \text{ Seconds}/127 \text{ Cycles}=7.874E\text{-}08 \text{ Seconds/Cycle}$$

$$1/7.874E\text{-}08=1.27E\text{+}7 \text{ Cycles per Second}=12.7 \text{ MHz}$$

With the technique of preferred embodiments:

$$1.0E\text{-}5 \text{ Seconds}/37 \text{ Cycles}=2.701E\text{-}08 \text{ Seconds/Cycle}$$

$$1/2.701E\text{-}08=3.7E\text{+}6 \text{ Cycles per Second}=3.7 \text{ MHz}$$

Since the power consumed by a processor is approximately linear with respect to the frequency, a system making use of the technique of preferred embodiments could use approximately 29% (3.7÷12.8×100) of the power of a similar system not incorporating the technique of the preferred embodiment.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus, comprising:
   a processing unit for executing data processing instructions, the processing unit having a plurality of modes of operation, each mode of operation having a corresponding stack for storing data associated with that mode;
   the processing unit, responsive to a return state data processing instruction, for writing return state data of the processing unit from a current mode of operation to a stack corresponding to a mode of operation different from the current mode of operation while remaining in the current mode of operation.

2. A data processing apparatus as claimed in claim 1, wherein the return state data processing instruction is invoked upon occurrence of an exception.

3. A data processing apparatus as claimed in claim 2, wherein the exception is one of a predetermined set of exceptions.

4. A data processing apparatus as claimed in claim 3, wherein the predetermined set of exceptions includes at least one interrupt.

5. A data processing apparatus as claimed in claim 1, further comprising:
   a set of registers, including a plurality of return state registers for storing the return state data of the processing unit for each mode of operation, the processing unit being able only to access return state registers containing the return state data of the processing unit from its current mode of operation.

6. A data processing apparatus as claimed in claim 1, wherein each stack has a stack pointer associated therewith identifying a location within the stack, the stack pointer for a particular stack only being accessible from the corresponding mode of operation.

7. A data processing apparatus as claimed on claim 5, wherein each stack has a stack pointer associated therewith identifying a location within the stack, the stack pointer for a particular stack only being accessible from the corresponding mode of operation, and wherein the set of registers include a plurality of stack pointer registers for storing the stack pointers for each stack, the processing unit being able only to access the stack point register containing the stack pointer for the stack corresponding to its current mode of operation.

8. A data processing apparatus as claimed in claim 1, wherein the return state data processing instruction includes a stack identifier field for identifying the stack to which the return state data of the processing unit is to be written.

9. A data processing apparatus as claimed in claim 8, wherein the stack identifier field is arranged to specify a stack pointer for the stack to which the return state data of the processing unit is to be written, thereby enabling the processing unit to access an appropriate location in that stack when writing the return state data to that stack.

10. A data processing apparatus as claimed in claim 9, wherein the return state data processing instruction includes an optional update field, which is set to indicate that the stack pointer is to be updated once the return state data has been written to the stack.

11. A data processing apparatus as claimed in claim 8, wherein the return state data processing instruction includes an address mode field for identifying the address mode of the stack to which the return state data is to be written.

12. A data processing apparatus as claimed in claim 8, wherein the return state data processing instruction includes a condition field for specifying a condition for execution of the return state data processing instruction, such that the return state data processing instruction is only executed by the processing unit if the condition is met.

13. A data processing apparatus as claimed in claim 1, wherein the current mode of operation is an exception mode, and the mode of operation different from said current mode is a privileged mode of operation.

14. A data processing apparatus as claimed in claim 1, wherein the current mode of operation is an exception mode, and the mode of operation different from said current mode is a mode of operation of the processing unit prior to entry into the exception mode.

15. A data processing apparatus as claimed in claim 1, wherein the return state data comprises a saved program counter and a saved processor status.

16. A method of operating a data processing apparatus comprising a processing unit for executing data processing instructions, the processing unit having a plurality of modes of operation, each mode of operation having a corresponding stack for storing data associated with that mode, the method comprising the step of:
   causing the processing unit, in response to a return state data processing instruction, to write return state data of the processing unit from a current mode of operation to a stack corresponding to a mode of operation different from the current mode of operation while remaining in said current mode of operation.

17. A computer program operable to configure a data processing apparatus to perform the method as claimed in claim 16.

18. A carrier medium comprising the computer program as claimed in claim 17.

* * * * *